(12) United States Patent
Willems

(10) Patent No.: US 11,821,829 B2
(45) Date of Patent: Nov. 21, 2023

(54) DEVICE AND METHOD FOR MEASURING THE DUST CONTENT OF AN AIR STREAM

(71) Applicant: OPTYL, Lummen (BE)

(72) Inventor: Yves Willems, Lummen (BE)

(73) Assignee: OPTYL, Lummen (BE)

( * ) Notice: Subject to any disclaimer, the term of this patent is extended or adjusted under 35 U.S.C. 154(b) by 550 days.

(21) Appl. No.: 17/047,863

(22) PCT Filed: Jul. 25, 2019

(86) PCT No.: PCT/IB2019/056372
§ 371 (c)(1),
(2) Date: Oct. 15, 2020

(87) PCT Pub. No.: WO2020/044141
PCT Pub. Date: Mar. 5, 2020

(65) Prior Publication Data
US 2021/0164879 A1    Jun. 3, 2021

(30) Foreign Application Priority Data
Aug. 29, 2018    (BE) .................................. 2018/5603

(51) Int. Cl.
*G01N 15/06* (2006.01)
*G01N 1/22* (2006.01)
*G01N 15/00* (2006.01)

(52) U.S. Cl.
CPC ....... *G01N 15/0625* (2013.01); *G01N 1/2205* (2013.01); *G01N 1/2247* (2013.01); *G01N 2015/0046* (2013.01)

(58) Field of Classification Search
CPC .................... G01N 1/2247; G01N 2015/0046
See application file for complete search history.

(56) References Cited

U.S. PATENT DOCUMENTS 3,784,902 A    1/1974  Huber
3,954,428 A *  5/1976  Marple ................ G01N 1/2247
                                                              96/417

(Continued)

FOREIGN PATENT DOCUMENTS

CN       106092846 A    11/2016
JP       S61-044551       3/1986

(Continued)

OTHER PUBLICATIONS

International Search Report dated Oct. 9, 2019, issued in corresponding International Application No. PCT/IB2019/056372, filed Jul. 25, 2019, 3 pages.

(Continued)

*Primary Examiner* — Thanh Luu
(74) *Attorney, Agent, or Firm* — Christensen O'Connor Johnson Kindness PLLC

(57) ABSTRACT

A device for measuring the dust content of an air stream includes a supply line having an inlet opening for supplying the air stream toward a measuring chamber for measuring the dust content. An adjustable flow rate pump is configured for suctioning the air stream toward the measuring chamber. A first measuring system is configured for measuring the velocity, temperature, pressure, and moisture content of the air stream at the inlet opening. A second measuring system is configured for measuring the flow rate, temperature, pressure, and moisture content of the air stream in the measuring chamber. A third measuring system is configured for measuring the dust content in the measuring chamber.

12 Claims, 1 Drawing Sheet

(56) References Cited

U.S. PATENT DOCUMENTS

| | | | | |
|---|---|---|---|---|
| 4,167,870 A | * | 9/1979 | Haas | ............... G01F 1/704 |
| | | | | 73/861.04 |
| 5,493,923 A | | 2/1996 | Balfanz et al. | |
| 5,571,946 A | | 11/1996 | Koshi et al. | |
| 6,439,027 B1 | | 8/2002 | Hiss, III | |
| 2002/0166365 A1 | * | 11/2002 | Kogure | ............... G01N 1/2258 |
| | | | | 73/28.01 |

FOREIGN PATENT DOCUMENTS

| | | |
|---|---|---|
| JP | H02-043640 | 3/1990 |
| JP | H09-089733 | 4/1997 |
| JP | H09-218154 | 8/1997 |
| JP | 2006-226866 | 8/2006 |
| JP | 2013-202571 | 10/2013 |
| WO | 2010/053386 A1 | 5/2010 |

OTHER PUBLICATIONS

Written Opinion of the International Searching Authority dated Oct. 9, 2019, issued in corresponding International Application No. PCT/IB2019/056372, filed Jul. 25, 2019, 8 pages.

International Preliminary Report on Patentability dated Jun. 2, 2020, issued in corresponding International Application No. PCT/IB2019/056372, filed on Jul. 25, 2019, 22 pages.

Office Action dated Apr. 11, 2023, issued in corresponding Japanese Application No. 2021-510388, 5 pages.

* cited by examiner

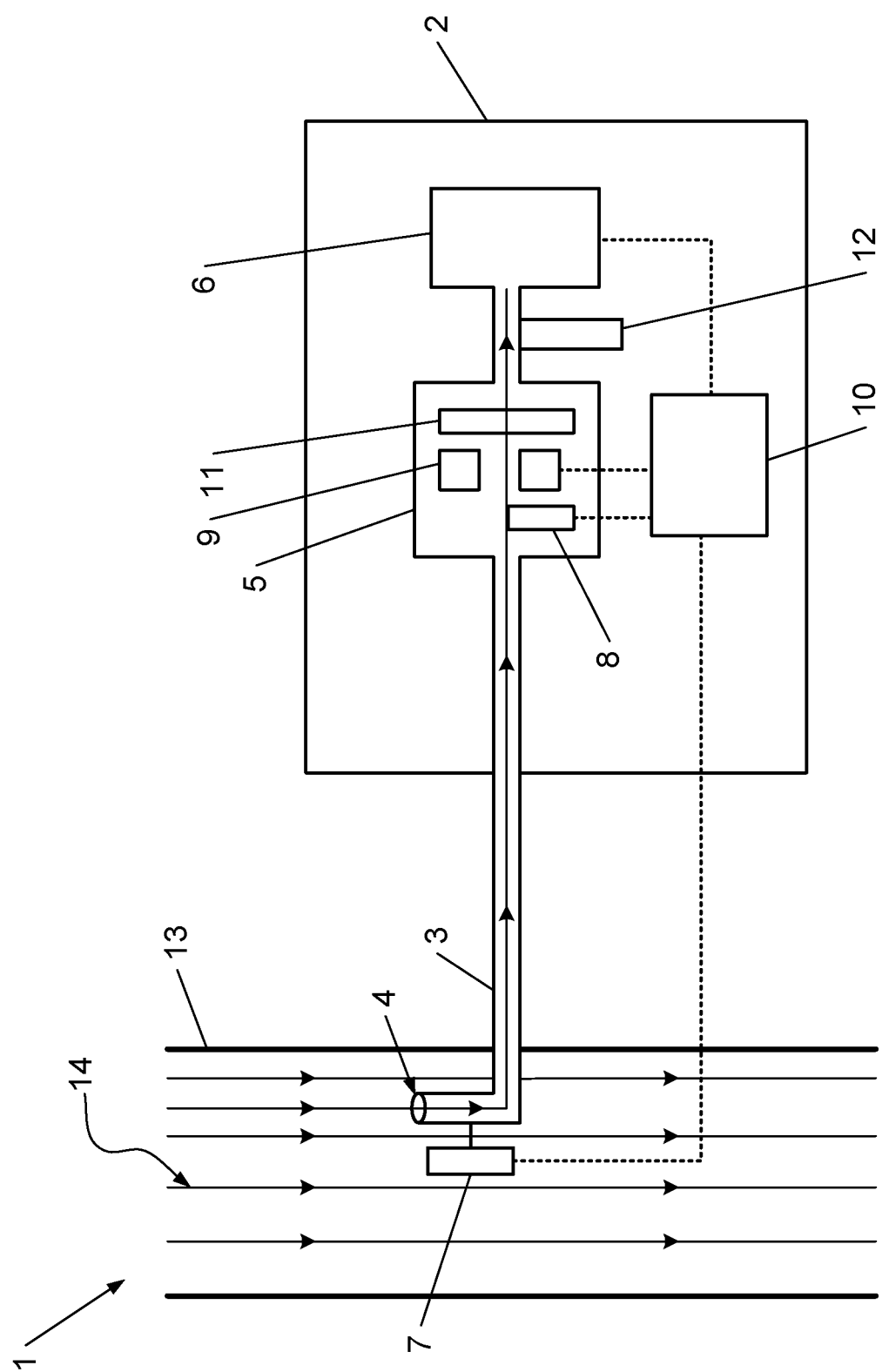

DEVICE AND METHOD FOR MEASURING THE DUST CONTENT OF AN AIR STREAM

TECHNICAL DOMAIN

The present invention relates to a device for measuring the dust content of an air stream, preferably in a duct. Furthermore, the present invention also relates to a method for measuring the dust content of an air stream in a duct using the device according to the present invention.

PRIOR ART

A device for measuring the dust content of an air stream is known from WO 2010/053386 A1 or from U.S. Pat. No. 3,784,902 A. Such a device is provided with a supply line having an inlet opening for supplying the air stream into the device. Furthermore, such a device also comprises a measuring chamber in fluid communication with the supply line. The device is provided with a pump having an adjustable flow rate for suctioning the air stream toward the measuring chamber via the supply line. The measuring chamber is provided with a measuring system for measuring the dust content of the air stream. In WO 2010/053386 A1, the measuring system comprises a light source and a photovoltaic cell. The dust content of the air stream is then determined from the changed intensity of light received by the photovoltaic cell upon passage of the air stream. In U.S. Pat. No. 3,784,902 A, the measuring system comprises two electrodes between which the air stream can flow. the dust content of the air stream is then determined from the electrical current flowing between both electrodes as a function of an applied electrical voltage. To allow the measurement of the dust content to be performed under isokinetic conditions, the velocity of the air stream external to the supply line at the inlet opening is measured by means of a pitot tube, and the velocity of the air stream in the supply line is measured by means of a venturi tube. Based on the difference between both velocities, the flow rate of the pump is then adjusted until both velocities are substantially equal.

Such devices bring the disadvantage that parameters of the air stream, such as for instance pressure, temperature and moisture content, may change when suctioning the air stream toward the measuring chamber via the supply line. These parameters are of interest, however, to allow the velocity of the air stream external to the supply line at the inlet opening to be compared in a correct way to the velocity of the air stream in the supply line or the measuring chamber, so as to allow a measurement of the dust content to be performed under isokinetic conditions. Further, these parameters are also of interest to allow a correct indication to be given, based on the dust content in the measuring chamber measured by means of the measuring system, of the amount of dust in the air stream supplied to the device.

A further disadvantage of such devices is that by controlling the pump based on the difference in the velocity between the air stream external to the supply line at the inlet opening and the velocity in the supply line, it may take some time for the isokinetic conditions to be reached.

DESCRIPTION OF THE INVENTION

The present invention aims to provide a device and a method allowing an accurate and direct measurement of the dust content of an air stream.

This aim is realized by means of the device showing the characteristics of the first independent claim, and the method showing the characteristics according to the second independent claim.

To this aim, the present invention provides a device for measuring the dust content of an air stream, preferably in a duct. The device comprises a supply line having an inlet opening for supplying the air stream into the device. The device comprises a measuring chamber for measuring therein the dust content of the air stream. The measuring chamber is in fluid communication with the supply line. The device comprises a pump having adjustable flow rate for suctioning the air stream toward the measuring chamber via the supply line. The pump is in fluid communication with the measuring chamber. The flow rate of the pump is adjustable according to a predetermined control parameter. The device comprises a first measuring system arranged for measuring at the inlet opening, external to the supply line, the velocity, the temperature, the pressure and the moisture content of the air stream at the inlet opening of the supply line. Preferably, the first measuring system is arranged for measuring at the inlet opening, external to the supply line, the velocity, the absolute temperature, the absolute pressure and the absolute moisture content of the air stream. The device comprises a second measuring system arranged for measuring in the measuring chamber the flow rate, the temperature, the pressure and the moisture content of the air stream in the measuring chamber. Preferably, the second measuring system is arranged for measuring in the measuring chamber the flow rate, the absolute temperature, the absolute pressure and the absolute moisture content of the air stream in the measuring chamber. The device comprises a third measuring system arranged for measuring in the measuring chamber the dust content of the air stream. Preferably, the third measuring system is arranged for measuring the dust content of the air stream using an electronically readable sensor. Preferably, the third measuring system is arranged for measuring in the measuring chamber the dust content of the air stream by means of an optical measurement. Preferably, the third measuring system is arranged for measuring in the measuring chamber the dust content of the air stream by means of light scattering at the dust particles in the air stream. The device comprises a control unit for controlling the device. The control unit is operationally connected to the pump, the first measuring system, the second measuring system and the third measuring system. The supply line and the measuring chamber have a predetermined shape and dimensions for establishing a predetermined relationship between the control parameter of the pump and the flow rate of the air stream in the measuring chamber at a given flow rate of the air stream at the inlet opening of the supply line.

The first measuring system and the second measuring system being arranged, in addition to measuring the velocity or the flow rate, for also measuring the temperature, the pressure and the moisture content of the air stream, respectively external to the supply line at the inlet opening and in the measuring chamber, offers the advantage that these parameters may be taken into account to allow the velocity of the air stream external to the supply line at the inlet opening to be compared in a correct way to the velocity of the air stream in the measuring chamber, so as to allow a measurement of the dust content to be performed in the measuring chamber, using the third measuring system, under isokinetic conditions.

The first measuring system and the second measuring system being arranged for measuring the temperature, the pressure and the moisture content of the air stream, respectively external to the supply line at the inlet opening and in the measuring chamber, further offers the advantage that these parameters may also be used to give a correct indication, based on the dust content of the air stream in the measuring chamber measured by means of the third measuring system, of the amount of dust in the air stream supplied to the device.

The predetermined shape and dimensions of the supply line and the measuring chamber offer the advantage that, based on a flow rate of the air stream external to the supply line at the inlet opening, which is determined from the parameters measured by the first measuring system, being the velocity, the temperature, the pressure and the moisture content of the air stream, a control parameter for the pump can be set directly to yield a flow rate of the air stream in the measuring chamber which is substantially equal to the flow rate of the air stream external to the supply line at the inlet opening. To this end, the measurement conditions can be quickly brought to the isokinetic conditions under which the measurement of the dust content of the air stream in the measuring chamber can be carried out by the third measuring system. The flow rate of the air stream in the measuring chamber, determined from the parameters measured by the second measuring system, being the flow rate, the temperature, the pressure and the moisture content of the air stream, may then further be used, as required, for carrying out smaller corrections to the control parameter of the pump, so as to achieve a flow rate of the air stream in the measuring chamber that approaches the flow rate of the air stream external to the supply line at the inlet opening with high accuracy.

In an embodiment of the device according to the present invention, the device further comprises a housing. Preferably, the device comprises a portable housing. The supply line is at least partially disposed inside the housing, with the inlet opening external to the housing. The first measuring system is arranged at the inlet opening external to the supply line. The measuring chamber, the pump, the second measuring system, the third measuring system and the control unit are arranged in the housing.

Installing the different parts of the device according to the present invention in a housing is advantageous to shield the different parts of any external influences that may impact the measurements, and thus to improve the accuracy of the measurements. Installing the different parts of the device in a portable housing is advantageous to allow the device to be moved, and to allow direct and accurate measurements to be quickly carried out on location.

In an embodiment of the device according to the present invention, the second measuring system is further arranged for measuring the oxygen content of the air stream in the measuring chamber.

A further parameter that may be of interest under certain conditions to be able to give a correct indication, based on the dust content of the air stream in the measuring chamber measured by means of the third measuring system, of the amount of dust in the air stream supplied to the device, is the oxygen content of the air stream in the measuring chamber. To this end, it is advantageous to further arrange the second measuring system to also determine the oxygen content of the air stream in the measuring chamber, so as to improve the accuracy of the amount of dust in the air stream supplied to the device, as determined from the dust content of the air stream in the measuring chamber measured by means of the third measuring system.

In an embodiment of the device according to the present invention, the device further comprises a filter in the measuring chamber after the third measuring system for gravimetrically determining the dust content of the air stream in the measuring chamber.

Further providing a filter in the measuring chamber offers the advantage that a gravimetric determination of the dust content of the air stream in the measuring chamber can additionally be carried out, which measurement can serve as a control for the measurement of the dust content of the air stream in the measuring chamber by means of the third measuring system. This further increases the accuracy of the device according to the present invention.

In an embodiment of the device according to the present invention, the device further comprises a dehumidification system between the measuring chamber and the pump for dehumidifying the air stream. The dehumidification system preceding the pump in the device is advantageous for protecting the pump against potential damage by moisture.

In an embodiment of the device according to the present invention, the dehumidification system comprises a steam trap and a silica filter.

In an embodiment of the device according to the present invention, the pump is a diaphragm pump.

In an embodiment of the device according to the present invention, the first measuring system comprises a pitot tube and a differential pressure sensor for measuring the velocity of the air stream at the inlet opening of the supply line.

In an embodiment of the device according to the present invention, the second measuring system comprises a hot wire mass flow meter for measuring the flow rate of the air stream in the measuring chamber.

In an embodiment of the device according to the present invention, the supply line is provided with a heater for heating the air stream in the supply line.

Further, the present invention also provides a computer-implemented method for measuring the dust content of an air stream in a duct by means of the device according to the present invention. The supply line of the device is arranged in the duct with the inlet opening in the air stream. The method comprises the following steps, performed by the control unit. The method comprises the step a) of measuring, by means of the first measuring system, the velocity, the temperature, the pressure and the moisture content of the air stream at the inlet opening of the supply line. Preferably, the method comprises the step a) of measuring, by means of the first measuring system, the velocity, the absolute temperature, the absolute pressure and the absolute moisture content of the air stream at the inlet opening of the supply line. The method comprises the step b) of calculating the flow rate of the air stream at the inlet opening of the supply line based on the velocity, temperature, pressure and moisture content of the air stream at the inlet opening of the supply line, as measured by the first measuring system. The method comprises the step c) of calculating the required control parameter of the pump for establishing a flow rate of the air stream in the measuring chamber which is substantially equal to the calculated flow rate of the air stream at the inlet opening of the supply line, according to the predetermined relationship between the control parameter of the pump and the flow rate of the air stream in the measuring chamber at a given flow rate of the air stream at the inlet opening of the supply line. The method comprises the step d) of controlling the pump according to the calculated control parameter for suctioning the air stream in the duct toward the measuring chamber via the supply line. The method comprises the step e) of measuring, by means of the second measuring system, the flow rate, the temperature, the pressure and the moisture content of the suctioned air stream in the measuring chamber. Preferably, the method comprises the step e) of measuring, by means of the second measuring system, the flow rate, the absolute temperature, the absolute pressure and the absolute moisture content of the suctioned air stream in the measuring chamber. The method comprises the step f) of calculating the flow rate of the suctioned air stream in the measuring chamber based on the flow rate, temperature, pressure and moisture content of the suctioned air stream in measuring chamber, as measured by the second measuring system. The method comprises the step g) of comparing the calculated flow rate of the suctioned air stream in the measuring chamber and the calculated flow rate of the air stream at the inlet opening of the supply line. If the calculated flow rate of the suctioned air stream in the measuring chamber and the calculated flow rate of the air stream at the inlet opening of the supply line are not substantially equal, step g) further comprises adjusting the control parameter of the pump accordingly, and repeating the steps d) to g) using the adjusted control parameter of the pump until the calculated flow rate of the suctioned air stream in the measuring chamber and the calculated flow rate of the air stream at the inlet opening of the supply line are substantially equal. The method comprises the step h) of measuring, by means of the third measuring system, the dust content of the suctioned air stream in the measuring chamber. The step h) further comprises measuring, by means of the second measuring system, the temperature, pressure and moisture content of the suctioned air stream in the measuring chamber. Preferably, the step h) further comprises measuring, by means of the second measuring system, the absolute temperature, the absolute pressure and absolute moisture content of the suctioned air stream in the measuring chamber. The method comprises the step i) of calculating the dust content of the suctioned air stream in the measuring chamber under normal conditions based on the dust content of the suctioned air stream in the measuring chamber measured by the third measuring system and the temperature, pressure and moisture content of the suctioned air stream in the measuring chamber measured by the second measuring system.

In an embodiment of the method according to the present invention, step h) also comprises measuring, by means of the second measuring system, the oxygen content of the suctioned air stream in the measuring chamber. In step i), the dust content of the suctioned air stream in the measuring chamber under normal conditions is also calculated based on the oxygen content of the suctioned air stream in the measuring chamber measured by the second measuring system.

In an embodiment of the method according to the present invention, the steps h) and i) are repeated periodically over a predetermined time period for calculating the average dust content of the suctioned air stream in the measuring chamber under normal conditions.

BRIEF DESCRIPTION OF THE DRAWINGS

The invention will hereafter be elucidated in further detail by means of the following description and the appended figures.

FIG. 1 shows a schematic depiction of the device according to an embodiment of the present invention.

MODES FOR CARRYING OUT THE INVENTION

The present invention will hereafter be described with respect to particular embodiments and with reference to certain drawings, but the invention is not limited thereto and is only defined by the claims. The drawings shown here are only schematic depictions and are non-limiting. In the drawings, the size of some of the elements may be exaggerated, meaning that the parts in question are not drawn to scale, being intended only for illustrative purposes. The dimensions and the relative dimensions do not necessarily correspond to actual reductions to practice of the invention.

Furthermore, terms such as "first", "second", "third" and the like in the description and in the claims are used for distinguishing between similar elements, and not necessarily for describing a sequential or chronological order. The terms in question are interchangeable under appropriate circumstances and the embodiments of the invention can operate in other sequences than those described or illustrated herein.

Moreover, terms such as "top", "bottom", "over", "under" and the like in the description and the claims are used for descriptive purposes and not necessarily for indicating relative positions. The terms so used are interchangeable under appropriate circumstances and the embodiments of the invention described herein can operate in other orientations than those described or illustrated herein.

The term "comprising" and its derivatives, as used in the claims, should not be interpreted as being restricted to the means listed thereafter; it does not exclude other elements or steps. It should be interpreted as specifying the presence of the stated features, integers, steps or components as referred to, without, however, precluding the presence or addition of one or more additional features, integers, steps or components, or groups thereof. Thus, the scope of an expression such as "a device comprising means A and B" is not limited to devices consisting only of components A and B. What is meant, on the contrary, is that with respect to the present invention, the only relevant components of the device are A and B.

FIG. 1 shows a schematic depiction of the device 1 for measuring the dust content of an air stream 14 according to an embodiment of the present invention.

The device 1 comprises a housing 2 in which the main parts of the device 1 are arranged, with the exception of a supply line 3 for an air stream 14 to be supplied to the device 1. The supply line 3 has an inlet opening 4 through which the air stream 14 can flow into the supply line 3. The inlet opening 4 is located externally to the housing 2. The supply line 3 extends from the inlet opening 4 to the housing 2, where the supply line 3 then continues inside the housing 2. To achieve a suitable supply of the air stream 14 to the device 1, the inlet opening 4 is preferably arranged substantially perpendicular to the flow direction of the air stream 14. The supply line 3 may optionally be provided with a heater for heating the air stream 14 in the supply line 3. The supply line 3 may further be provided with a shut-off valve for shutting off the supply line 3 so that a leaking test may be performed on the device 1.

The device 1 further comprises a measuring chamber 5 which is in fluid communication with the supply line 3 so that an air stream 14 may flow from the supply line 3 toward the measuring chamber 5. The measuring chamber is arranged for measuring therein the dust content of the air stream 14.

The device 1 further also comprises a pump 6 which is in fluid communication with the measuring chamber 5. The pump 6 is arranged for suctioning the air stream 14 toward the measuring chamber 5 via the supply line 3. The pump 6 arranged so that the flow rate of the pump 6 is adjustable according to a control parameter. The control parameter may for instance be a control voltage of the pump 6, or for instance a digital signal in the case of a digitally controlled pump 6. By setting the flow rate of the pump 6 via the control parameter, a measurement of the dust content of the air stream 14 can be carried out in the measuring chamber 5 under isokinetic conditions, wherein the velocity of the air stream 14 external to the supply line 3 at the inlet opening 4 is substantially equal to the velocity of the air stream 14 in the measuring chamber 5.

As a pump 6, a diaphragm pump may for instance be used. A diaphragm pump 6 offers the advantage that it is relatively compact and has a low weight. This allows the pump 6 to be easily installed in the housing 2, and further allows the device 1 to be kept light and compact. Furthermore, a diaphragm pump 6 can also handle a wide range of flow rates for suctioning the air stream 14, so that the device 1 can be used for measuring, under isokinetic conditions, the dust content of air streams 14 at different velocities. It should however be understood that other suitable pumps known to the person skilled in the art may also be used.

To protect the pump 6 from damage by moisture of moisture condensing in the air stream 14, the device 1 may further optionally be provided with a dehumidification system 12 between the measuring chamber 5 and the pump 6. The dehumidification system 12 may for instance comprise a steam trap for removing most of the moisture condensing in the air stream 14. The dehumidification system 12 may, if required, be further supplemented with a silica filter for further drying the air stream 14 after leaving the steam trap, but prior to the pump 6.

External to the supply line 3, at the inlet opening 4, the device 1 is provided with a first measuring system 7. The first measuring system 7 is arranged for measuring the velocity, the temperature, the pressure and the moisture content of the air stream 14 in this position. Preferably, the absolute temperature, the absolute pressure and the absolute moisture content of the air stream 14 are hereby measured. For measuring the velocity of the air stream 14, the first measuring system 7 is for instance provided with a pitot tube in combination with a differential pressure sensor, but other suitable sensors known to the person skilled in the art for measuring the velocity of an air stream 14 may also be used.

In the measuring chamber 5, the device 1 is provided with a second measuring system 8. The second measuring system 8 is arranged for measuring the flow rate, the temperature, the pressure and the moisture content of the air stream 14 in the measuring chamber 5. Preferably, the absolute temperature, the absolute pressure and the absolute moisture content of the air stream 14 are hereby measured. For measuring the flow rate of the air stream 14, the second measuring system 8 is for instance provided with a hot wire mass flow meter, but other suitable sensors known to the person skilled in the art for measuring the flow rate of an air stream 14 may also be used. The second measuring system 8 is preferably also arranged for measuring the oxygen content of the air stream 14 in the measuring chamber 5.

In the measuring chamber 5, the device 1 is also provided with a third measuring system 9. The third measuring system 9 is arranged for measuring the dust content of the air stream 14 in the measuring chamber 5. For measuring the dust content of the air stream 14, use is preferably made of a combination of a laser light source for illuminating the air stream 14 and a sensor for measuring the light scattered by the dust particles in the air stream 14 in a direction or directions different to the direction of the laser beam of the laser light source. Such an optical measurement allows a quick measurement of the dust content of the air stream 14, wherein the measured dust content may then be read electronically from the sensor. However, other sensors known to the person skilled in the art for measuring the dust content in an air stream 14 that allow a quick measurement of the dust content and electronic reading of the measured dust content, may also be used.

Optionally, the device 1 may also be provided with a filter 11 positioned after the third measuring system in the measuring chamber 5, seen according to the flow direction of the air stream 14 of the inlet opening 4 of the supply line 3 toward the pump 6. The filter 11 is arranged for gravimetric determination of the dust content of the air stream 14 in the measuring chamber 5. Herein, the dust contained in the air stream 14 is deposited onto the filter 11 at a known weight, and after the measurement, the filter 11 and the deposited dust are then weighed to determine the amount of dust in the air stream 14 in the measuring chamber 5. This additional measurement then serves as a control for the measurement of the dust content of the air stream 14 in the measuring chamber 5 by means of the third measuring system 9.

The supply line 3, the measuring chamber 5 and, by extension, any connection between the measuring chamber 5 and the pump 6 have a predetermined shape and dimensions. This establishes a predetermined relationship between the control parameter of the pump 6 and the flow rate of the air stream 14 in the measuring chamber 5 for a given flow rate of the air stream 14 at the inlet opening 4 of the supply line 3. This predetermined relationship makes it possible to determine the flow rate of the air stream 14 at the inlet opening 4 using the first measuring system 1, and to subsequently select, based on the relationship, the suitable control parameter for the pump 6 to achieve a flow rate of the air stream 14 in the measuring chamber 5 that is substantially equal to the flow rate of the air stream 14 at the inlet opening 4 of the supply line 3, so that a measurement of the dust content of the air stream 14 in the measuring chamber 5 using the third measuring system 9 can be carried out under isokinetic conditions.

The device 1 further comprises a control unit 10 for controlling the different parts of the device 1. Thus, the control unit 10 is operationally connected to the first measuring system 7 for measuring the velocity, the temperature, the pressure and the moisture content of the air stream 14 external to the supply line 3 at the inlet opening 4, with the second measuring system 8 for measuring the flow rate, temperature, the pressure, the moisture content and optionally the oxygen content of the air stream 14 in the measuring chamber 5, and with the third measuring system 9 for measuring the dust content of the air stream 14 in the measuring chamber 5. The control unit 10 may then instruct the measuring systems 7, 8, 9 to carry out the measurements, read out the values measured by the respective measuring systems 7, 8, 9, and process the measured values for further use.

Furthermore, the control unit 10 is also operationally connected to the pump 6 for controlling the pump 6 based on the control parameter. The control parameter may then be determined by the control unit 10 according to the relationship between the control parameter of the pump 6 and the flow rate of the air stream 14 in the measuring chamber 5 for the flow rate of the air stream 14 at the inlet opening 4 of the supply line 3, calculated based on the values measured by the first measuring system 7. Here, a comparison can further be made between the flow rate of the air stream 14 in the measuring chamber 5, calculated based on the values measured by the second measuring system 8, and the flow rate of the air stream 14 external to the supply line 3 at the inlet opening 4 calculated based on the values measured by the first measuring system 7, for carrying out corrections to the control of the pump 6.

If required, the control unit 10 may also be operationally connected to a shut-off valve provided on the supply line 3, for opening and closing the supply line 3. The control unit 10 may then further be arranged for carrying out a leaking test on the device 1 while the supply line 3 is closed off by the shut-off valve.

Measuring the dust content of an air stream 14 in a duct 13 using the device 1 according to an embodiment of the present invention then takes place as follows.

First, the supply line 3 of the device 1 is placed with the inlet opening 4 into the duct 13. Here, the inlet opening 4 is preferably placed into the duct 13 substantially perpendicular to the flow direction of the air stream 14, so as to achieve a suitable supply of the air stream 14 toward the device 1.

Subsequently, the first measuring system 7 is controlled by the control unit 10 for measuring the velocity, the temperature, the pressure and the moisture content of the air stream 14 at the inlet opening 4 of the supply line 3. Based on the values measured by the first measuring system 7, the flow rate in the duct 13 of the air stream 14 is then calculated by the control unit 10 at the inlet opening 4 of the supply line 3.

In a subsequent step, the control parameter for the pump 6 is then calculated by the control unit 10 as required for achieving a flow rate of the air stream 14 in the measuring chamber 5 which is substantially equal to the flow rate of the air stream 14 at the inlet opening 4 of the supply line 3, as calculated by the control unit 10 based on the values measured by the first measuring system 7. This takes place based on the known relationship between the control parameter of the pump 6 and the flow rate of the air stream 14 in the measuring chamber 5 at a given flow rate of the air stream 14 at the inlet opening 4 of the supply line 3.

In a further step, the pump 6 is then controlled by the control unit 10 according to the calculated control parameter for suctioning the air stream 14 in the duct 5 toward the measuring chamber 5 via the supply line 3.

Subsequently, the second measuring system 8 is controlled by the control unit 10 for measuring, in the measuring chamber 5, the flow rate, the temperature, the pressure, the moisture content and optionally the oxygen content of the air stream 14 suctioned by the pump 6 toward the measuring chamber 5. Based on the values measured by the second measuring system 8, the flow rate of the air stream 14 in the measuring chamber 5 is then calculated by the control unit 10.

The flow rate of the air stream 14 in the measuring chamber 5, calculated based on the values measured by the second measuring system 8, is then, in a subsequent step, compared by the control unit 10 to the flow rate of the air stream 14 at the inlet opening 4 of the supply line 3 as calculated based on the values measured by the first measuring system 7. In case both calculated flow rates are not substantially equal, an adjusted control parameter for the pump 6 is then calculated by the control unit 10 based on the difference between the calculated flow rates. Using the adjusted control parameter, the preceding steps, starting from the controlling of the pump 6, can then be repeated by the control unit 10 until the calculated flow rates are substantially equal. In case the calculated flow rates are substantially equal, the isokinetic conditions are achieved and the steps described below for measuring the dust content of the air stream 14 can be carried out.

In these steps, the third measuring system 9 is then controlled by the control unit 10 for measuring, in the measuring chamber 5, the dust content of the air stream 14 suctioned by the pump 6 toward the measuring chamber 5. Herein, the second measuring system 8 is then also controlled by the control unit 10 for measuring, in the measuring chamber 5, the temperature, the pressure, the moisture content and optionally the oxygen content of the air stream 14 suctioned by the pump 6 toward the measuring chamber 5. These measurements are carried out over a predetermined time period, and may be repeated, if so desired, for calculating average values.

Based on dust content measured by the third measuring system 9 and the values measured by the second measuring system 8, the dust content under normal conditions of the air stream 14 suctioned by the pump 6 toward the measuring chamber 5 is then calculated by the control unit 10. If required, during the measurements, the flow rate of the air stream 14 at the inlet opening 4 of the supply line 3 and the flow rate of the air stream 14 in the measuring chamber 5 may also be monitored by the control unit 10 and, respectively, the first measuring system 7 and the second measuring system 8. This is to verify if the isokinetic conditions are maintained during the measurement of the dust content of the air stream 14 in the measuring chamber 5 by the third measuring system 9.

If required, before and after measuring the dust content of the air stream 14 in the duct 13 using the device 1, a leaking test may additionally be carried out to ensure that no leaks are present in the device 1 that may have influenced the measurement of the dust content.

REFERENCES 1 device
2 housing
3 supply line
4 inlet opening
5 measuring chamber
6 pump
7 first measuring system
8 second measuring system
9 third measuring system
10 control unit
11 filter
12 dehumidification system
13 duct
14 air stream

The invention claimed is:

1. A device for measuring a dust content of an air stream, comprising:
   a supply line having an inlet opening configured for supplying the air stream to the device;
   a measuring chamber configured for measuring the dust content of the air stream, wherein the measuring chamber is in fluid communication with the supply line;
   a pump with an adjustable flow rate, the pump being configured for suctioning the air stream toward the measuring chamber via the supply line, wherein the adjustable flow rate of the pump is adjustable according to a control parameter;
   a first measuring system configured for measuring, external to the supply line, at the inlet opening, an inlet velocity, an inlet temperature, an inlet pressure, and an inlet moisture content of the air stream;
   a second measuring system configured for measuring, in the measuring chamber, a measuring chamber flow rate, a measuring chamber temperature, a measuring chamber pressure, and a measuring chamber moisture content of the air stream;

a third measuring system configured for measuring, in the measuring chamber, the dust content of the air stream; and a control unit configured for controlling the device and being operationally connected to the pump, the first measuring system, the second measuring system, and the third measuring system, wherein the supply line and the measuring chamber have a predetermined shape and dimensions configured for establishing a predetermined relationship between the control parameter of the pump and the measuring chamber flow rate of the air stream at a given flow rate of the air stream at the inlet opening.

2. The device according to claim 1, further comprising a housing, wherein the supply line is at least partially disposed inside the housing with the inlet opening disposed external to the housing, wherein the first measuring system is disposed external to the supply line at the inlet opening, and wherein the measuring chamber, the pump, the second measuring system, the third measuring system, and the control unit are disposed inside the housing.

3. The device according to claim 1, further comprising a filter disposed in the measuring chamber downstream of the third measuring system relative to a flow direction of the airstream for gravimetrically determining the dust content of the air stream in the measuring chamber.

4. The device according to claim 1, further comprising a dehumidification system disposed between the measuring chamber and the pump.

5. The device according to claim 4, wherein the dehumidification system comprises a steam trap and a silica filter.

6. The device according to claim 1, wherein the pump is a diaphragm pump.

7. The device according to claim 1, wherein the first measuring system comprises a pitot tube and a differential pressure sensor configured for measuring the inlet velocity of the air stream at the inlet opening.

8. The device according to claim 1, wherein the second measuring system comprises a hot wire mass flow meter configured for measuring the measuring chamber flow rate of the air stream.

9. A method for measuring a dust content of an air stream in a duct with the device according to claim 1, wherein the supply line of the device is disposed in the duct with the inlet opening of the device disposed in the air stream, the method comprising:

a) measuring, with the first measuring system, the inlet velocity, the inlet temperature, the inlet pressure, and the inlet moisture content of the air stream at the inlet opening;

b) calculating an inlet flow rate of the air stream at the inlet opening based on the inlet velocity, the inlet temperature, the inlet pressure, and the inlet moisture content of the air stream;

c) calculating the control parameter of the pump required for establishing a measuring chamber flow rate of the air stream equal to the inlet flow rate of the air stream, according to the predetermined relationship between the control parameter of the pump and the measuring chamber flow rate of the air stream at a given inlet flow rate of the air stream;

d) controlling the pump according to the calculated control parameter for suctioning the air stream in the duct toward the measuring chamber via the supply line;

e) measuring, with the second measuring system, the measuring chamber flow rate, the measuring chamber temperature, the measuring chamber pressure, and the measuring chamber moisture content of the air stream in the measuring chamber;

f) calculating the measuring chamber flow rate of the air stream in the measuring chamber based on the measuring chamber flow rate, the measuring chamber temperature, the measuring chamber pressure, and the measuring chamber moisture content of the air stream, as measured by the second measuring system;

g) comparing the calculated measuring chamber flow rate of the air stream and the calculated inlet flow rate of the air stream, and if the calculated measuring chamber flow rate and the calculated inlet flow rate are not equal, adjusting the control parameter of the pump to arrive at an adjusted control parameter, and repeating steps d) to g) using the adjusted control parameter until the calculated measuring chamber flow rate of the air stream and the calculated inlet flow rate of the air stream are equal;

h) measuring, with the third measuring system, the dust content of the air stream in the measuring chamber, and measuring, with the second measuring system, the measuring chamber temperature, the measuring chamber pressure, and the measuring chamber moisture content of the air stream; and i) calculating a normal dust content of the air stream in the measuring chamber based on the dust content of the air stream in the measuring chamber, as measured by the third measuring system, and the measuring chamber temperature, measuring chamber pressure, and measuring chamber moisture content of the air stream, as measured by the second measuring system.

10. Method according to claim 9, wherein the steps h) and i) are repeated periodically over a predetermined time period for calculating an average normal dust content of the air stream in the measuring chamber.

11. The device according to claim 1, wherein the third measuring system is configured for measuring, in the measuring chamber, the dust content of the air stream by scattering light at dust particles in the air stream.

12. The device according to claim 1, wherein the third measuring system is configured for measuring, in the measuring chamber, the dust content of the air stream via an optical measurement.

* * * * *